United States Patent
Sasaki et al.

(10) Patent No.: US 9,449,764 B2
(45) Date of Patent: Sep. 20, 2016

(54) ELECTRIC STORAGE DEVICE

(71) Applicant: GS Yuasa International Ltd., Kyoto-shi (JP)

(72) Inventors: Takeshi Sasaki, Kyoto (JP); Yoshihiro Katayama, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 1 day.

(21) Appl. No.: 14/505,619

(22) Filed: Oct. 3, 2014

(65) Prior Publication Data

US 2015/0024274 A1    Jan. 22, 2015

Related U.S. Application Data

(63) Continuation of application No. 13/353,120, filed on Jan. 18, 2012, now Pat. No. 8,865,352.

(30) Foreign Application Priority Data

Jan. 19, 2011    (JP) .................................. 2011-008661

(51) Int. Cl.
*H01G 11/26* (2013.01)
*H01M 4/96* (2006.01)
(Continued)

(52) U.S. Cl.
CPC .............. *H01G 11/26* (2013.01); *H01G 11/36* (2013.01); *H01G 11/56* (2013.01); *H01M 4/0435* (2013.01); *H01M 4/133* (2013.01); *H01M 4/1393* (2013.01); *H01M 4/583* (2013.01); *H01M 4/587* (2013.01); *H01M 4/96* (2013.01); *H01M 10/0525* (2013.01);

(Continued)

(58) Field of Classification Search
CPC ...................................................... H01M 4/583
See application file for complete search history.

(56) References Cited

U.S. PATENT DOCUMENTS 6,803,150 B1    10/2004 Iriyama et al.
8,865,352 B2 *  10/2014 Sasaki ................. H01M 4/0435
                                            429/209

(Continued)

FOREIGN PATENT DOCUMENTS

EP    1 126 538 A1    8/2001
JP    H 05-48320 B2   7/1993

(Continued)

OTHER PUBLICATIONS

Extended European Search Report dated May 8, 2012.

(Continued)

*Primary Examiner* — Scott J Chmielecki
(74) *Attorney, Agent, or Firm* — McGinn IP Law Group PLLC

(57) ABSTRACT

An electric storage device includes a negative electrode, a positive electrode, and a separator interposed between the negative electrode and the positive electrode, the negative electrode including a negative electrode layer including an active material including an amorphous carbon particle capable of occluding and releasing at least one of an alkali metal and an alkaline earth metal, and a binder. The negative electrode layer includes a plurality of pores, and a ratio S1/S2 of a specific surface area (S1) of micropores having a pore diameter of 1 nm or more and 3 nm or less in the pores to a specific surface area (S2) of mesopores having a pore diameter of 20 nm or more and 100 nm or less therein is 0.3 or more and 0.9 or less.

18 Claims, 4 Drawing Sheets

(51) Int. Cl.
  H01M 4/04 (2006.01)
  H01M 4/133 (2010.01)
  H01M 4/1393 (2010.01)
  H01M 4/583 (2010.01)
  H01M 10/0525 (2010.01)
  H01G 11/36 (2013.01)
  H01G 11/56 (2013.01)
  H01M 4/587 (2010.01)
  H01M 4/02 (2006.01)

(52) U.S. Cl.
  CPC ...... *H01M 2004/021* (2013.01); *H01M 2004/027* (2013.01); *Y02E 60/122* (2013.01); *Y02T 10/7011* (2013.01)

(56) References Cited

U.S. PATENT DOCUMENTS

| | | |
|---|---|---|
| 2001/0031391 A1 | 10/2001 | Hironaka et al. |
| 2004/0101756 A1 | 5/2004 | Koyama et al. |
| 2008/0241696 A1 | 10/2008 | Hinoki et al. |
| 2008/0241701 A1 | 10/2008 | Okumura et al. |
| 2009/0297953 A1 | 12/2009 | Shimizu et al. |
| 2009/0316334 A1* | 12/2009 | Fukumine ............. H01G 11/24 361/502 |
| 2010/0009260 A1 | 1/2010 | Tanaka et al. |
| 2010/0297509 A1* | 11/2010 | Okumura .......... H01M 10/0569 429/331 |

FOREIGN PATENT DOCUMENTS

| | | |
|---|---|---|
| JP | 2000-138061 A | 5/2000 |
| JP | 2001-210330 A | 8/2001 |
| JP | 2001-222995 A | 8/2001 |
| JP | 2001-325948 A | 11/2001 |
| JP | 2001-325949 A | 11/2001 |
| JP | 2002-015774 A | 1/2002 |
| JP | 2002-260633 A | 9/2002 |
| JP | 2003-346801 A | 12/2003 |
| JP | 2005-158623 A | 6/2005 |
| JP | 2007-39289 A | 2/2007 |
| JP | 2007-39290 A | 2/2007 |
| JP | 2007-91557 A | 4/2007 |
| JP | 2007-180251 A | 7/2007 |
| JP | 2007-326732 A | 12/2007 |
| JP | 2009-123671 A | 6/2009 |
| JP | 2009-158532 A | 7/2009 |
| JP | 2010-21032 A | 1/2010 |
| JP | 2011-20907 A | 2/2011 |
| WO | WO 2007/040007 A1 | 4/2007 |

OTHER PUBLICATIONS

U.S. Office Action dated Apr. 24, 2013 in U.S. Appl. No. 13/353,120.

U.S. Office Action dated Oct. 9, 2013 in U.S. Appl. No. 13/353,120.

U.S. Notice of Allowance dated Jun. 20, 2014 in U.S. Appl. No. 13/353,120.

* cited by examiner

F I G . 1
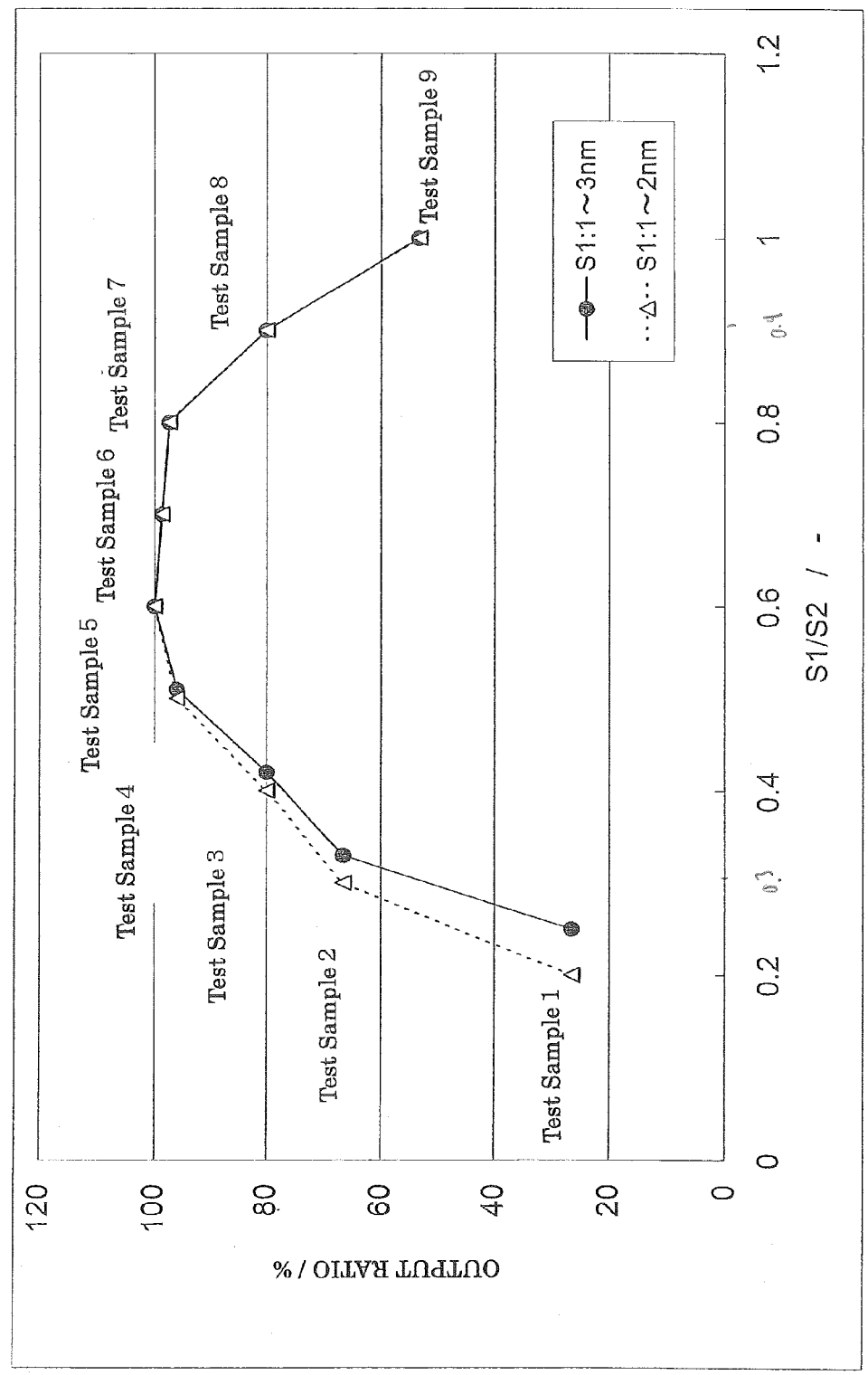

ELECTRIC STORAGE DEVICE

The present application is a Continuation Application of U.S. patent application Ser. No. 13/353,120, filed on Jan. 18, 2012, which is based on and claims priority from Japanese patent application No. 2011-008661, filed on Jan. 19, 2011, the entire contents of which are incorporated herein by reference.

FIELD OF THE INVENTION

The present invention relates to a negative electrode, an electrode assembly using the negative electrode, and an electric storage device using the electrode assembly.

BACKGROUND ART

In recent years, rechargeable and dischargeable electric storage devices including nonaqueous electrolyte cells represented by lithium ion cells and capacitors such as electric double layer capacitors and the like have been used as power sources for electronic equipment whose performance enhancement and downsizing have been progressed, power sources for power storage, power sources for electric vehicles and the like.

The nonaqueous electrolyte cell is a cell in which a negative electrode and a positive electrode prepared by providing a negative electrode active material layer (negative electrode layer) and a positive electrode active material layer (positive electrode layer) on a current collector composed of a metal foil, respectively, are arranged to face each other through a separator electrically separating the electrodes, and ions are accepted and donated between the positive electrode and negative electrode in a nonaqueous electrolyte to charge and discharge the cell.

Carbon materials are used as the negative electrode active material because of their enhanced safety and enhanced cycle characteristics; and as such carbon materials, carbon materials having a large specific surface area are used in order to obtain a high energy density.

For example, Patent Document 1 to Patent Document 3 (Patent Document 1: JP-A-2009-458532, Patent Document 2: JP-A-2007-39289, and Patent Document 3: JP-A-2010-21032) each describe an electrode assembly using a negative electrode active material composed of a carbon material having a plurality of pores in its surface.

Patent Document 4 (Patent Document 4: JP-A-2000-138061) describes a method of increasing the specific surface area of a negative electrode layer by applying and drying and thereafter pressurizing a slurry containing a graphite material having its surface coated with an amorphous carbon to a current collector.

However, it is difficult to effectively improve the power output of a cell only by increasing the specific surface area of a negative electrode layer. For example, the method of increasing the specific surface area by pressurizing a negative electrode layer containing graphite as described above results in formation of a large number of pores having a diameter of 1 nm or smaller when the pressure during application is too strong. If excessively fine pores like this occur in large amount in the graphite, there arises a possibility of causing a decrease in the output.

SUMMARY OF THE INVENTION

It is an object of the present invention to provide a negative electrode, an electrode assembly and an electric storage device, which can improve the power output.

In order to solve the above-mentioned problem, the present inventors provide a negative electrode which is provided with a negative electrode layer containing: an active material containing an amorphous carbon particle capable of occluding and releasing at least one of an alkali metal and an alkaline earth metal; and a binder, the negative electrode layer having a plurality of pores, and the ratio $S1/S2$ of the specific surface area ($S1$) of micropores having a pore diameter of 1 nm or larger and 3 nm or smaller in the pores to the specific surface area ($S2$) of mesopores having a pore diameter of 20 nm or larger and 100 nm or smaller therein being 0.3 or higher and 0.9 or lower.

Here, the specific surface areas $S1$ and $S2$ of pores in the present invention refer to specific surface areas corresponding to each pore diameter, which is acquired through a pore distribution analysis by DFT method using a pore distribution measured by the nitrogen gas adsorption method.

The micropore in the present invention refers to a pore having a pore diameter of 3 nm or smaller as measured by a method similar to the measurement method of the specific surface area; and the mesopore refers to a pore having a pore diameter of 3 nm or larger and 100 nm or smaller as measured by the similar method.

As one embodiment according to the present invention, the amorphous carbon particle may be at least one selected from the group consisting of non-graphitizable carbons and graphitizable carbons.

As another embodiment according to the present invention, the alkali metal or the alkaline earth metal may be at least one selected from the group consisting of lithium, sodium, magnesium and calcium In this case, the alkali metal may be lithium.

Further as another embodiment according to the present invention, the pores may include a pore that opens to a surface of the amorphous carbon particle, a portion of the pore having no binder adhered thereto exposed on a surface of the negative electrode layer.

The electrode assembly according to the present invention uses the negative electrode as described above.

The electric storage device according to the present invention uses the electrode assembly as described above.

BRIEF DESCRIPTION OF THE DRAWINGS

FIG. 1 is a graph showing relationships between S/S2 ratios and output ratios of Test Samples;

DETAILED DESCRIPTION OF THE PREFERRED EMBODIMENTS

Figure 2:
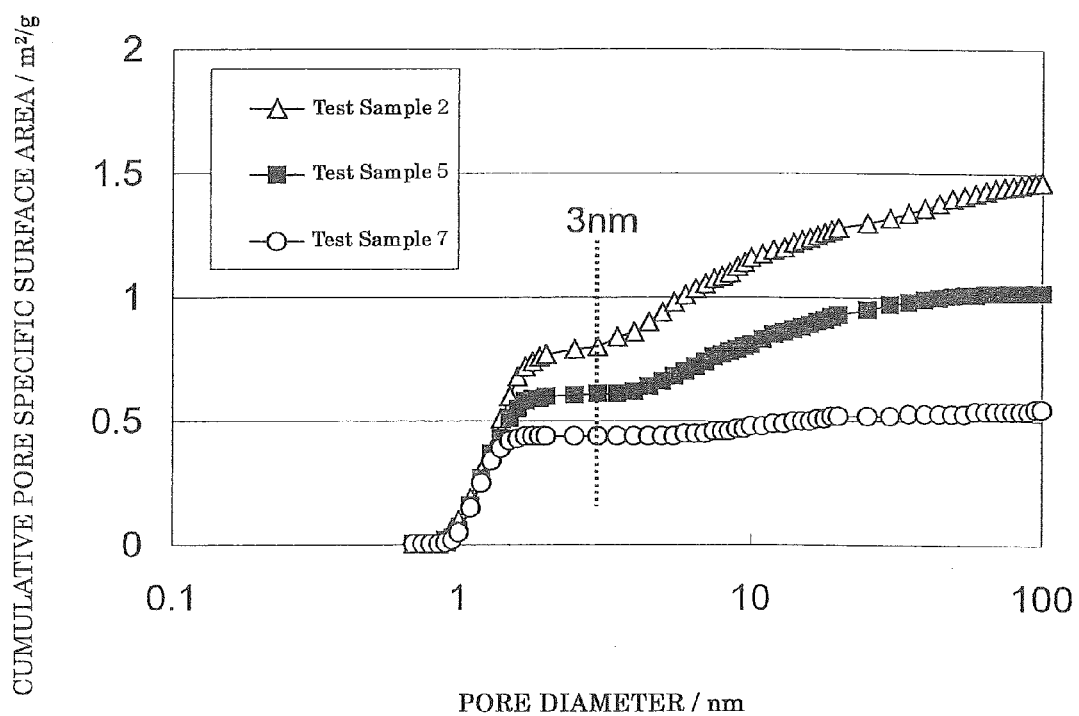
FIG. 2 is a graph showing relationships between cumulative pore specific surface areas and pore diameters of Test Samples.

Hereinafter, a negative electrode, an electrode assembly, and a nonaqueous electrolyte cell as an electric storage device using an electrode assembly according to the present embodiment will be described specifically.

The negative electrode according to the present embodiment includes:

a negative electrode layer including: an active material including an amorphous carbon particle capable of occluding and releasing at least one of an alkali metal and an alkaline earth metal; and a binder, the negative electrode layer having a plurality of pores; and the ratio S1/S2 of the specific surface area (S1) of micropores having a pore diameter of 1 nm or larger and 3 nm or smaller in the pores to the specific surface area (S2) of mesopores having a pore diameter of 20 nm or larger and 100 nm or smaller therein being 0.3 or higher and 0.9 or lower.

In the present embodiment, the alkali metal or the alkaline earth metal which the amorphous carbon particle is capable of occluding and releasing is preferably one selected from the group consisting of lithium, sodium, magnesium and calcium, and the amorphous carbon particle capable of occluding and releasing lithium as an alkali metal is particularly preferable.

The amorphous carbon is preferably at least one selected from the group consisting of non-graphitizable carbons (hard carbons) and graphitizable carbons (soft carbons).

Above all, a non-graphitizable carbon is preferably used because of its non-oriented carbon planes and excellence in the output/input performance.

Such an amorphous carbon is used that has a large number of pores present on the surface thereof and that can provide a negative electrode layer in which the ratio S1/S2 of the specific surface area (S1) of micropores having a pore diameter of 1 nm or larger and 3 nm or smaller, preferably 1 nm or larger and 2 nm or smaller, in the pores of the surface to the specific surface area (S2) of mesopores having a pore diameter of 20 nm or larger and 100 nm or smaller therein is in the range of 0.3 or higher and 0.9 or lower, preferably 0.4 or higher and 0.9 or lower, and especially preferably 0.5 or higher and 0.8 or lower, by making the negative electrode layer by means as described later.

Since the amorphous carbon as described above is a harder carbon material than crystalline carbons such as graphite, and the orientation of the amorphous carbon when being subjected to a pressure is low, it is believed that the specific surface area of pores can easily be regulated to the above-mentioned ratio.

The amorphous carbon is advantageous in that, even when the specific surface area is large, the amorphous carbon is unlikely to cause deterioration in performance due to decomposition of an electrolyte as compared with graphite.

Here, the hardness of the amorphous carbon as described above is preferably in the range of 360 to 940, and more preferably 550 to 900, in terms of Vickers hardness. The Vickers hardness of an amorphous carbon can be measured using, for example, a Dynamic Ultra Micro Hardness Tester (tester name: DUH-211S, made by Shimadzu Corp.).

The amorphous carbon is desirably a powder having an average particle size of 5 to 25 μm. In order to obtain the powder in a predetermined shape, a pulverizer and a classifier are used. Examples include a mortar, ball mill, sand mill, vibration ball mill, planetary ball mill, jet mill, counter jet mill, swirling airflow-type jet mill, and sieve. Wet pulverization in which water or an organic solvent such as ethanol is made to coexist at pulverization may be used. A classification method is not especially limited, and a sieve, a wind power classifier or the like of either dry or wet type is used according to needs.

In the negative electrode according to the present embodiment, a negative electrode layer is formed from a mixture containing the amorphous carbon particle as the active material, and a binder.

For the binder, a thermoplastic resin such as polyvinylidene fluoride (PVDF), polytetrafluoroethylene (PTFE), polyethylene and polypropylene, and a polymer which has a rubber elasticity, such as ethylene-propylene-diene rubber (EPDM), sulfonated EPDM, styrene-butadiene rubber (SBR) and fluororubber, is typically usable as a single substance or a mixture of two or more thereof.

The amount of the binder to be added is preferably 1 to 15% by mass, and especially preferably 3 to 10% by mass, with respect to the total mass of a negative electrode layer.

If the addition amount of the binder is in this range, there is no risk that the negative electrode active material is excessively covered with the binder and the output improvement effect is inhibited.

In the present embodiment, the pores include a pore that opens to the surface of the amorphous carbon particle and whose portions having no binder adhered thereto are exposed on the surface of the negative electrode layer.

Although the negative electrode layer contains the active material and the binder in the present embodiment, since pores whose portions having no binder adhered thereto are exposed on the surface of the negative electrode layer are present, the ratio of the specific surface area (S1) of the micropores to the specific surface area (S2) of the mesopores as described above can more easily provide an output improvement effect.

The negative electrode layer may contain a thickener, a filler and the like as other constituents.

For the thickener, a polysaccharide such as carboxymethyl cellulose or methyl cellulose is usable as a single substance or a mixture of two or more thereof. A thickener having a functional group reacting with lithium as in polysaccharides is desirably inactivated in the functional group, for example, by methylation. The amount of the thickener to be added is preferably 0.5 to 5% by mass, and especially preferably 1 to 3% by mass, with respect to the total mass of a negative electrode layer.

For the filler, any materials may be used unless they adversely affect the cell performance. Typically, an olefinic polymer such as polypropylene and polyethylene, amorphous silica, alumina, zeolite, glass, carbon and the like are usable. The amount of the filler to be added is preferably 0.5 to 5% by mass, and especially preferably 1 to 3% by mass, with respect to the total mass of a negative electrode layer.

Application of pressure causes pores in the surface of the amorphous carbon particle to vary.

When a predetermined pressure is applied to the amorphous carbon particle while being mixed with other constituents such as the binder, the thickener, the filler and the like to provide a negative electrode layer, the negative electrode layer is formed such that the ratio S1/S2 of the specific surface area (S1) of pores having a pore diameter of 1 nm or larger and 3 nm or smaller in pores of the negative electrode layer to the specific surface area (S2) of pores having a pore diameter of 20 nm or larger and 100 nm or smaller therein is in the range of 0.3 or higher and 0.9 or lower.

In the present embodiment, since the amorphous carbon particle is pressurized after being mixed with a binder, the amount of the binder to be blended can be reduced, and an output improvement effect by pores of a negative electrode layer can easily be provided.

Hereinafter, a method will be described specifically which manufactures a negative electrode provided with a negative electrode layer by applying to an electrode plate a mixture prepared by mixing the amorphous carbon particle with the other materials.

First, an amorphous carbon particle, a binder, and other additives according to needs, as described above, are mixed in an organic solvent such as N-methylpyrrolidone or toluene, water or the like, and thereafter, the obtained mixture for a negative electrode is applied to a current collector for the negative electrode.

For the current collector for the negative electrode, copper, nickel, iron, stainless steel, titanium or the like is usable. Additionally, the surface of a current collector made of such a material may be subjected to treatment with carbon, nickel, titanium, silver or the like for the purpose of improving adhesivity, electroconductivity, and reducibility resistance.

A preferred thickness of the current collector may optionally be set, but may be, for example, 5 to 30 μm, and preferably 8 to 20 μm.

With respect to a method of applying the mixture to a current collector, the application can be carried out to provide a desired thickness and a desired shape by means of, for example, roller coating using an applicator roll or the like, screen coating, a doctor blade system, spin coating and a bar coater.

The thickness of the applied mixture is about 30 to 300 μm, and preferably about 50 to 200 μm.

The mixture is applied by an above-mentioned means, and then dried, and further pressed by pressurizing means such as a roll press machine to form a negative electrode layer.

The pressing at this time is carried out at a press linear pressure of 50 to 1,400 kgf/cm, and preferably 300 to 800 kgf/cm.

Pressing at a press linear pressure in this range can regulate the ratio S1/S2 of the specific surface area (S1) of micropores having a pore diameter of 1 nm or larger and 3 nm or smaller in pores of the negative electrode layer to the specific surface area (S2) of mesopores having a pore diameter of 20 nm or larger and 100 nm or smaller therein to a ratio of 0.3 or higher and 0.9 or lower, and thus can provide a high power electrode.

In the case where the press linear pressure is lower than the above-mentioned range, the total amount of the pores is insufficient, or the density of the amorphous carbon particle becomes low. Because of this, the electroconductive path becomes insufficient, which could result in causing insufficient power output when an electrode is fabricated.

By contrast, in the case where the press linear pressure is higher than the above-mentioned range, the amorphous carbon in the negative electrode layer is broken, which causes peeling-off of the amorphous carbon from a current collector, or the like, thus decreasing the function as an electrode.

In order to adjust the press linear pressure to the above-mentioned range, the roll diameter of a roll press machine and the feed rate of a negative electrode are adjusted.

A preferred roll diameter is, for example, 250 mm to 750 mm.

A preferred feed rate is, for example, 2 m/min to 20 m/min.

The pressing may be carried out under heating, for example, while a roller of the roll press machine is heated. Pressing under heating can soften a binder in a negative electrode layer to thereby strengthen the pressing.

The heating temperature at this time is preferably 50 to 150° C.

In the case where the pressing is carried out under heating as described above, it is preferable that a binder, a thickener, a filler and the like are blended in appropriate amounts in an amorphous carbon particle so that the mixture does not peel off from a current collector during pressing.

By pressing the mixture containing an amorphous carbon particle as described above, and thereafter drying, a negative electrode is fabricated in which a negative electrode layer containing the amorphous carbon and a binder is formed on a current collector.

The overall porosity of the thus fabricated negative electrode layer is about 30 to 45%, and preferably about 36% to 42%, which is preferable in order to provide an output improvement effect.

A state in which the porosity is higher than the above-mentioned range, that is, a state in which the density of a negative electrode layer is low, is considered to be a state in which the pore specific surface area is insufficient because the negative electrode layer has not been compressed.

In the case where a negative electrode layer composed of an amorphous carbon particle is formed in which the proportion of the specific surface area of micropores to that of mesopores as described above is suitable, the porosity as the negative electrode layer becomes about 36% to 42%.

By winding an electrode assembly prepared by laminating a negative electrode as described above and a positive electrode described later with a separator interposed therebetween, and accommodating the wound electrode assembly along with a nonaqueous electrolyte in a cell case, a nonaqueous electrolyte cell (for example, a lithium ion cell) as an example of electric storage devices is manufactured.

The positive electrode is formed by providing a positive electrode layer containing a positive electrode active material on one surface or on both surfaces of a current collector for the positive electrode.

For the positive electrode active material, in the case of use in an electrode assembly for a lithium ion cell, the following are usable, for example: complex oxides represented by the general formula $Li_xMO_2$ or $Li_yM_2O_4$ (provided that M is a transition metal, $0 \leq x \leq 1$, and $0 \leq y \leq 2$) which is capable of occluding and releasing lithium, olivine compounds, oxides having tunnel-shaped cavities, and metal chalcogenides having a lamellar structure. The specific example is preferably composed of a powder of a positive electrode material including lithium cobaltate ($LiCoO_2$), lithium nickelate ($LiNiO_2$), lithium manganate ($LiMn_2O_4$), $Li_2MnO_4$, $MnO_2$, $FeO_2$, $V_2O_5$, $V_6O_{13}$, $TiO_2$ and $TiS_2$.

For the current collector for the positive electrode, aluminum, titanium, stainless steel and nickel are usable, for example. Alternatively, a current collector may be used in which the surface of aluminum or the like is subjected to treatment with carbon, nickel, titanium, silver or the like for the purpose of improving adhesivity, electroconductivity, and oxidizability resistance.

For the separator, a woven fabric, a nonwoven fabric, a plastic microporous membrane and the like are usable, and in particular the plastic microporous membrane is suitable. Above all, polyethylene and polypropylene-made microporous membranes, microporous membranes made of polyethylene and polypropylene composited with aramide and polyimide, or polyolefinic microporous membranes such as microporous membranes obtained by compositing these are suitably used from the viewpoint of thickness, membrane strength, membrane resistance and the like.

The electrolyte to be used is a nonaqueous electrolyte in which an electrolytic salt is dissolved in a nonaqueous solvent.

The nonaqueous solvent includes cyclic carbonate esters such as propylene carbonate and ethylene carbonate; cyclic esters such as γ-butyrolactone and γ-valerolactone; chain carbonates such as dimethyl carbonate, diethyl carbonate and ethyl methyl carbonate; chain esters such as methyl formate, methyl acetate and methyl butyrate; tetrahydrofuran or derivatives thereof; ethers such as 1,3-dioxane, 1,4-dioxane, 1,2-dimethoxyethane, 1,4-dibutoxyethane and methyl diglyme; nitriles such as acetonitrile and benzonitrile; dioxolan and derivatives thereof; and ethylene sulfide, sulfolane and sultone or derivatives thereof, as a single substance or as a mixture of two or more thereof.

Examples of the electrolytic salt include ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$ and KSCN as a single substance or as a mixture of two or more thereof.

By accommodating such an electrolyte and the electrode assembly in a cell case, the nonaqueous electrolyte cell (for example, a lithium ion cell) is manufactured.

EXAMPLES

Then, the present invention will be described in more detail by way of Examples, but the present invention is not limited thereto.
(Fabrication of Test Samples)

First, negative electrodes were fabricated.

A mixture for the negative electrodes in which 95 parts by weight of an amorphous carbon particle (a non-graphitizable carbon, Carbotron P, average particle diameter 9 μm made by KUREHA CORPORATION) as a negative electrode active material, and 5 parts by weight of a polyvinylidene fluoride (PVDF) as a binder were mixed was applied to a copper foil of 10 μm as a negative electrode current collector so that the thickness of the mixture became 40 μm, dried at 150° C. for 10 min, and thereafter subjected to compression forming by a roll press.

The press linear pressure of the roll press at this time was given at nine levels as indicated in Table 1 to fabricate nine kinds of negative electrodes having a negative electrode layer (Test Samples 1 to 9).

The press roll was heated to 150° C.

The roll diameter of the roll press machine was 500 mm, and the feed rate for the negative electrode plate was 5 m/min.

Cells were further fabricated using the negative electrodes of Test Samples 1 to 9.

The cells were each fabricated by laminating the negative electrode and a positive electrode with a separator interposed therebetween, winding the laminate, and accommodating the wound laminate along with an electrolytic solution in an aluminum laminate case.

For the positive electrode material, lithium cobaltate was used; for the separator, a polyethylene-made microporous membrane having a thickness of 25 μm was used; and for the electrolytic solution, a solution was used in which $LiPF_6$ was dissolved in ethylene carbonate:dimethyl carbonate:diethyl carbonate=4:4:2 (% by volume) so as to become 1 mol/l.
(Measurement of the Power Output)

The power outputs of the cells using the negative electrodes of Test Samples 1 to 9 were measured.

The cell of each Test Sample having the above-mentioned constitution was fabricated so as to have a rated capacity of 500 mAh; the cell was charged to 4.1 V; thereafter, a V-I plot was generated from data acquired by discharging the cell for 10 seconds at current values of 0.5, 2, 5 and 10 A, for 10 seconds each, and the plot was linearly approximated by the least squares method; and a current value when the approximated line was extrapolated to a voltage of 2.0 V was calculated. A value acquired by multiplying the current value at this time by the lower limit voltage (here, 2.0 V) was defined as an output.
(Measurement of S1/S2)

Then, the ratio S1/S2(1) was calculated by measuring the specific surface area (S1) of micropores having a pore diameter of 1 nm or larger and 3 nm or smaller among the pores of each of the negative electrodes of Test Samples 1 to 9 and the specific surface area (S2) of mesopores having a pore diameter of 20 nm or larger and 100 nm or smaller thereamong.

The ratio S1/S2(2) also was simultaneously calculated in the case of the specific surface area (S1) of micropores having a pore diameter of 1 nm or larger and 2 nm or smaller in the pores of each of the negative electrodes.

Specifically, first, each of the negative electrodes of Test Samples 1 to 9 fabricated in the above-mentioned method was cut into 4×30 cm together with the current collector, put in a measurement tube, dried at 105° C. for several hours, and thereafter measured for the pore distribution by the nitrogen gas adsorption-desorption method using a specific surface area and pore distribution analyzer (trade name: Autosorb-1 series, made by Quantachrome Corp.); and the specific surface area (S1) of micropores having a pore diameter of 1 nm or larger and 3 mu or smaller, and the specific surface area (S2) of mesopores having a pore diameter of 20 nm or larger and 100 nm or smaller were calculated by DFT method (Density Functional Theory).

Here, the negative electrodes used were those in a discharged state retrieved from dismantled cells, which were discharged to 2.0 V at 0.1 ItA (50 mA) at an ambient temperature of 25° C., and then kept at a constant voltage of 2.0 V for 4 hours before dismantling.

Relationships between the cumulative pore specific surface areas of pores of each pore diameter of Test Samples 2, 5 and 7 as measured by the above-mentioned method and the pore diameters are shown in Table 2.

Relationships between the output ratio (%) and S1/S2 of Test Samples 1 to 9 are shown in the graph of FIG. 1 and Table 1 where the output of Test Sample 5 which exhibited the highest output among Test Samples 1 to 9 is set to be 100%.

Further, the negative electrodes before the compression forming by a press roll in the fabrication of the test samples were measured for the pore distribution by the method similar to the above to calculate the S1 and S2.

Figure 4:
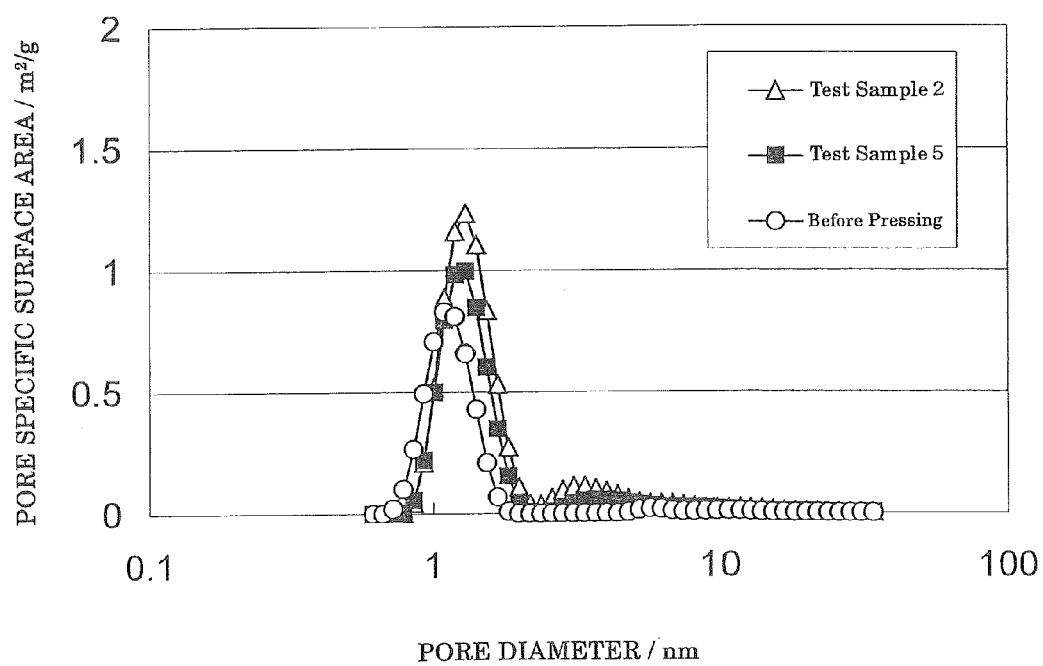
FIG. 4 is a graph showing influences of pressing on relationships between pore specific surface areas and pore diameters.

For the sample before the pressing, and Test Samples 2 and 5, relationships between the pore diameters and the pore specific surface areas are shown in the graph of FIG. 4.

TABLE 1

| | Press Linear Pressure (kgf/cm) | S1/S2 (1) | S1/S2 (2) | Output Ratio (%) | Porosity (%) |
|---|---|---|---|---|---|
| Test Sample 1 | 1400 | 0.25 | 0.20 | 27 | 28.0 |
| Test Sample 2 | 1200 | 0.33 | 0.30 | 67 | 30.0 |
| Test Sample 3 | 1000 | 0.42 | 0.40 | 80 | 32.0 |

TABLE 1-continued

|  | Press Linear Pressure (kgf/cm) | S1/S2 (1) | S1/S2 (2) | Output Ratio (%) | Porosity (%) |
|---|---|---|---|---|---|
| Test Sample 4 | 800 | 0.51 | 0.50 | 96 | 34.0 |
| Test Sample 5 | 600 | 0.60 | 0.60 | 100 | 38.0 |
| Test Sample 6 | 400 | 0.70 | 0.70 | 99 | 41.0 |
| Test Sample 7 | 300 | 0.80 | 0.80 | 97 | 44.0 |
| Test Sample 8 | 200 | 0.90 | 0.90 | 80 | 45.0 |
| Test Sample 9 | 100 | 1.00 | 1.00 | 53 | 48.0 |

As is clear from Table 1 and FIG. 1, Test Samples 2 to 8, in which S1/S2 (1) were 0.3 to 0.9, maintained high outputs of 67% or higher in output ratio.

In particular, Test Samples 4 to 7, in which S1/S2 were 0.5 to 0.8, maintained very high outputs of 90% or higher in output ratio.

By contrast, it is clear that in Test Sample 9, in which S1/S2 (1) exceeded 0.9, and Test Sample 1, in which S1/S2 (1) is lower than 0.3, the output ratios considerably decreased.

Additionally, in Test Samples 8 and 9, peeling-off of the negative electrode material from the current collector was caused.

Figure 3:
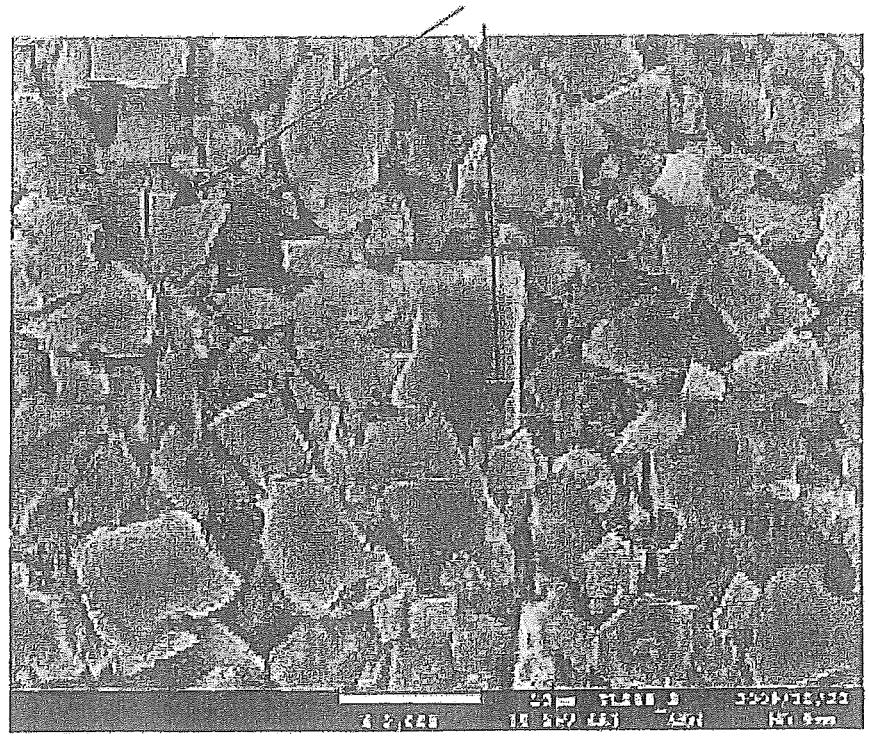
FIG. 3 is an electron microscopic image of a surface of a negative electrode according to the present invention.

The negative electrode layer surface of Test Sample 5 was observed by an electron microscope (scanning electron microscope JSM-T 330A, made by JEOL Ltd., an image magnified 2,000×), revealing that cracks were formed on the negative electrode layer surface as shown in FIG. 3.

From the true density and the compositional ratio of each material (active material, binder) of the negative electrode layer of each Test Sample, the true density (the density at a porosity of 0%) of the negative electrode layer was calculated.

Then, the volume and the weight of the negative electrode layer were measured, and the porosity was calculated by the following expression from the ratio of a bulk density calculated from these values to the true density.

$$\text{Porosity}(\%)=100-(\text{bulk density/true density})\times 100$$

Here, the volume of the negative electrode layer was determined from the thickness acquired by subtracting a copper foil thickness of the current collector from the thickness of the negative electrode cut into a predetermined size, and the cut size. The weight of the negative electrode layer was determined by measuring the weight of the negative electrode cut into a predetermined size, and the weight of the copper foil, and subtracting the copper foil weight from the negative electrode weight.

Porosities (%) thus determined are shown in Table 1.

It is clear from FIG. 2 that Test Samples having a lower porosity, that is, having been subjected to a higher press pressure, had larger pore specific surface areas of the micropores and the mesopores.

It is believed that this occurred because the pore of amorphous carbon, which is porous, was divided to thereby become fine pores by pressing of the negative electrode material and the like, and the binder covering the pore peeled off to thereby expose the pore surface.

It is clear from FIG. 4 that the pore volumes of Test Samples 2 to 5 increased more than those of the test samples before the pressing.

That is, it is believed that the pressing caused opening of fresh pores in the negative electrode active material surface.

The invention claimed is:

1. An electric storage device, comprising:
    a negative electrode;
    a positive electrode; and
    a separator interposed between the negative electrode and the positive electrode, the negative electrode comprising a negative electrode layer, the negative electrode layer comprising:
        an active material comprising an amorphous carbon particle capable of occluding and releasing at least one of an alkali metal and an alkaline earth metal; and
        a binder, the negative electrode layer including a plurality of pores,
    the negative electrode layer having a thickness of 30 μm to 300 μm, and
    a ratio S1/S2 of a specific surface area (S1) of micropores having a pore diameter of 1 nm or more and 3 nm or less in the pores to a specific surface area (S2) of mesopores having a pore diameter of 20 nm or more and 100 nm or less therein being 0.3 or more and 0.9 or less.

2. The electric storage device according to claim 1, wherein the amorphous carbon particle comprises non-graphitizable carbons.

3. The electric storage device according to claim 1, wherein the alkali metal or the alkaline earth metal is at least one selected from the group consisting of lithium, sodium, magnesium, and calcium.

4. The electric storage device according to claim 3, wherein the alkali metal comprises lithium.

5. The electric storage device according to claim 1, wherein the pores comprise a pore that opens to a surface of the amorphous carbon particle, a portion of the pore having no binder adhered thereto being exposed on a surface of the negative electrode layer.

6. The electric storage device according to claim 1, wherein the ratio S1/S2 of the specific surface area (S1) of the micropores to the specific surface area (S2) of the mesopores is 0.4 or more and 0.9 or less.

7. The electric storage device according to claim 1, wherein the ratio S1/S2 of the specific surface area (S1) of the micropores to the specific surface area (S2) of the mesopores is 0.5 or more and 0.8 or less.

8. The electric storage device according to claim 1, wherein a hardness of the amorphous carbon particle is in a range from 360 to 940 in terms of Vickers hardness.

9. The electric storage device according to claim 1, wherein the specific surface areas S1 and S2 refer to specific surface areas corresponding to each pore diameter, which is acquired through a pore distribution analysis using a pore distribution measured by a nitrogen gas adsorption.

10. The electric storage device according to claim 1, wherein an amount of the binder is in a range of 3% to 10% by mass with respect to a total mass of the negative electrode layer.

11. The electric storage device according to claim 1, wherein an overall porosity of the negative electrode layer is in a range from 36% to 42%.

12. The electric storage device according to claim 1, wherein the thickness of the negative electrode layer is in a range from 50 μm to 200 μm.

13. The electric storage device according to claim 1, wherein the active material consists essentially of the amorphous carbon particle.

14. The electric storage device according to claim 1, wherein the negative electrode layer is formed by pressing at a press linear pressure of 50 kgf/cm to 1,400 kgf/cm.

15. A negative electrode layer, comprising:
an active material comprising an amorphous carbon particle capable of occluding and releasing at least one of an alkali metal and an alkaline earth metal; and
a binder,
the negative electrode layer including a plurality of pores,
the negative electrode layer having a thickness of 30 μm to 300 μm, and
a ratio S1/S2 of a specific surface area (S1) of micropores having a pore diameter of 1 nm or more and 3 nm or less in the pores to a specific surface area (S2) of mesopores having a pore diameter of 20 nm or more and 100 nm or less therein being 0.3 or more and 0.9 or less.

16. The negative electrode layer according to claim 15, wherein the thickness of the negative electrode layer is in a range from 50 μm to 200 μm.

17. The negative electrode layer according to claim 15, wherein the active material consists essentially of the amorphous carbon particle.

18. The negative electrode layer according to claim 15, wherein the negative electrode layer is formed by pressing at a press linear pressure of 50 kgf/cm to 1,400 kgf/cm.

* * * * *